United States Patent [19]

McKaveney et al.

[11] 4,360,384

[45] Nov. 23, 1982

[54] COMPOSITION FOR CORROSION PROTECTION USING METAL SILICIDES OR ALLOYS OF SILICON AND METALS

[75] Inventors: James P. McKaveney, Claremont; Vernon P. Simpson, Laguna Beach, both of Calif.

[73] Assignee: Occidental Chemical Corporation, Niagara Falls, N.Y.

[21] Appl. No.: 136,898

[22] Filed: Apr. 3, 1980

Related U.S. Application Data

[63] Continuation-in-part of Ser. No. 959,037, Nov. 8, 1978, abandoned, which is a continuation-in-part of Ser. No. 758,295, Jan. 10, 1977, abandoned, which is a continuation-in-part of Ser. No. 566,483, Apr. 9, 1975, Pat. No. 4,002,481.

[51] Int. Cl.$^3$ ................................................ C09D 5/08
[52] U.S. Cl. .................................. 106/1.12; 106/1.17; 106/1.25; 106/14.21; 106/14.33; 106/14.39; 106/287.16; 106/84
[58] Field of Search ................. 106/1.17, 14.21, 14.25, 106/14.27, 14.33, 14.39, 1.12, 1.25

[56] References Cited

U.S. PATENT DOCUMENTS

| | | | |
|---|---|---|---|
| 3,562,124 | 2/1971 | Leon et al. | 204/148 |
| 3,884,705 | 5/1975 | Blair | 106/1.17 |
| 3,888,575 | 6/1975 | Fujii et al. | 106/14 |

OTHER PUBLICATIONS

Kirk-Othmer, *Encyclopedia of Chem. Technology*, vol. 18, p. 127.

*Primary Examiner*—Lorenzo B. Hayes
*Attorney, Agent, or Firm*—James F. Tao; William G. Gosz

[57] ABSTRACT

A coating composition is provided which is suitable for the protection of corrodible metallic surfaces. The coating composition includes a binder and a filler, with the filler present in an amount sufficient to impart corrosion-resistant characteristics to the coating composition. The filler comprises conductive metal particles and particles of a metal composition which comprises silicon and at least one active metal. The metal composition can be an alloy of silicon with an active metal which is unstable when introduced alone into water or a silicide of an active metal which is unstable when introduced alone into water.

17 Claims, No Drawings

COMPOSITION FOR CORROSION PROTECTION USING METAL SILICIDES OR ALLOYS OF SILICON AND METALS

CROSS-REFERENCE TO RELATED APPLICATIONS

This application is a continuation-in-part of Ser. No. 969,037, now abandoned filed Nov. 8, 1978, which is a continuation-in-part of Ser. No. 758,295, now abandoned filed Jan. 10, 1977, which is a continuation-in-part of Ser. No. 566,483 filed Apr. 9, 1975, now U.S. Pat. No. 4,002,481 issued Jan. 11, 1977. Application Ser. No. 959,037, application Ser. No. 758,295, and U.S. Pat. No. 4,002,481 are incorporated herein by this reference.

BACKGROUND OF THE INVENTION

This invention relates to an improved composition for providing corrosion resistance for corrodible metallic surfaces.

Various compositions have been proposed in the prior art to provide varying measures of protection against corrosion of corrodible metallic surfaces. In more recent years, attention has been progressively given over to providing compositions and systems for providing cathodic-anodic corrosion protection for metallic surfaces of structural elements. Such structures as underground pipes, storage tanks, buildings and the like, as well as metallic structures continually in contact with water, such as ships, support structures for drilling rigs, docks and the like have been treated with or coated with a variety of compositions or systems to impart varying degrees of corrosion resistance thereto.

Generally, such systems or compositions as have been employed utilize either an external source of electrical current which serves to maintain as cathodic the surface to be protected or the corrosion protection composition itself forms an internal current with the metallic surface to be protected. In the latter systems, the coatings contain metallic particles which are more anodic in nature than the metallic surface to be protected and thus serve to function as sacrificial anodes. Most commonly, in coatings of this latter type, the composition is comprised primarily of a binder and a filler. The binder may be any suitable organic or inorganic binder material and the filler is constituted by conductive metallic particles which are more anodic than the metallic surface to be protected against corrosion. Most generally, the metallic particles utilized in such coating compositions are zinc particles.

It is known that such zinc-rich (80–95%) coating compositions serve to protect against harmful corrosion of corrodible metal surfaces to a greater degree than do ordinary paints, particularly when applied to iron and steel surfaces. Such zinc-rich coating compositions are effective in salt-air atmospheres and in applications where the coated metal surface contacts brine solutions. Zinc powder has for some time been recognized as having a specific use as a pigment in the anti-fouling and anti-corrosive ship bottom paints. For such applications, it is necessary to produce coating compositions comprised of a finely divided zinc powder suspended in a heavy-bodied drying oil, a spar varnish or lacquer. Extreme fineness has been a chief requisite for successful application in this area.

Zinc-rich coating compositions are compounded in such a manner to provide a subsequent dry film containing 85 to 95 percent zinc dust, with no zinc oxide. The coatings are rich in metallic zinc which is in intimate contact with the iron or steel surface to be protected and provide sacrificial electrochemical or cathodic protection to the base metal, such as occurs on galvanized products. Also, as in galvanizing, the zinc-rich coating film is electrically conductive. This dual property of direct metal to metallic zinc contact and good electrical conductivity of the dry film distinguishes zinc-rich coatings from other corrosion-inhibitive coating compositions. The coating composition is formulated with the zinc dust in suitable vehicles, such as, for example, plasticized polystyrene, chlorinated rubber, and some inorganic materials. Such vehicles must have sufficient strength to carry the high metallic particle concentration involved and yet provide adherence and flexibility.

While such protective coating compositions have been used to an appreciable extent, the metal particles, such as zinc powder or dust, add greatly to the cost of such compositions. In addition to the cost factor, it is frequently necessary to utilize appreciable quantities of this relatively expensive metallic filler on the order of 80 percent or more of the weight of the total composition in order to provide the requisite corrosion protection of the metallic surface.

Attempts have been made to reduce the requirements for zinc metal in such zinc-rich coating compositions as, for example, by replacing a portion of the metallic zinc particle filler material with inert refractory alloys or the like. Such coating compositions, which are disclosed in U.S. Pat. No. 3,562,124, are electrically conductive, brittle, and substantially non-reactive in water. These compositions contain generally from 25 to 50 percent of the inert refractory ferroalloy and 50 to 75 percent zinc powder or dust, based on the total weight of filler present in the coating composition. While such compositions serve to impart corrosion resistance, such compositions still require the presence and use of considerable percentages of zinc powder or dust.

Zinc is in large measure imported into the United States and it is desirable to replace it with more commonly available metals.

SUMMARY OF THE INVENTION

It is an object of the present invention to provide a corrosion protective coating composition for corrodible metal surfaces, which coating composition provides corrosion protection comparable to that provided by present zinc-rich coating compositions.

A further object of the present invention is to provide an improved corrosion protective coating composition for corrodible metallic surfaces, which coating composition is more readily available than the presently employed zinc-rich coating compositions.

In accordance with the present invention, a coating composition suitable for the protection of corrodible metallic surfaces is provided. The coating composition comprises a binder and a filler with the filler present in an amount sufficient to impart corrosion-resistant characteristics to the coating composition. The filler comprises conductive metal particles and particles of a metal composition comprising silicon and a highly active metal. The highly active metal is selected from the group consisting of manganese and the metals above manganese on the electromotive series and mixtures thereof.

These and other objects, features, aspects, and advantages of the present invention will become apparent to those skilled in the art when considered with respect to the following detailed description and appended claims.

DETAILED DESCRIPTION

Pursuant to the above objects, the present invention provides for a coating composition suitable for the protection of corrodible metallic surfaces which comprises a binder and a filler. The filler is present in an amount sufficient to impart corrosion-resistant characteristics to the coating composition and is constituted of conductive metal particles, together with particles of a metal composition or mixtures of metal compositions. Such a metal composition comprises an alloy of silicon and active metals which are unstable when introduced alone into water and/or silicides of active metals which are unstable when introduced alone into water.

By "active metal" it is intended to encompass those metals which are manganese and those metals above manganese in the electromotive series (+1.03 volts electrode oxidation potential versus the standard hydrogen electrode) and which normally corrode heavily in aqueous systems or in acid solutions unless protected. Highly active metals suitable for forming the metal compositions, i.e., the silicon alloys and silicides, include calcium, barium, magnesium, aluminum, lithium, cerium, titanium, lanthanum, manganese, and the like. Preferably, the active metals are selected from the group consisting of calcium, magnesium, manganese, and barium.

The corrosion resistance afforded corrodible metallic surfaces by the coating composition of this invention approximates that afforded by zinc-rich coating compositions. Additionally, the use of the filler comprising the metal composition of this invention imparts desirable properties to corrosion-inhibiting coating compositions not obtained by the use of zinc powder or dust. For example, the silicon tends to give desirable body to the coating composition and any oxidation of the metal composition, i.e., the alloy or silicide, tends to produce silicates, which function as a binder in the coating composition producing a greatly resistant finish. Further, in certain instances, better adhesion and improved abrasive resistance is achieved over comparable zinc-rich coatings.

Suitable metal compositions, including silicon alloys and silicides, for use in the protective coating compositions of the present invention include steel-making alloys prepared by the ferroalloy industry. General formulations of metal compositions, i.e., alloys or silicides, useful in practice of principles of the present invention are listed in TABLE I. The elements listed in TABLE I are by weight percent of the total composition.

TABLE I

| Element | Metal Composition I | Metal Composition II | Metal Composition III | Metal Composition IV | Metal Composition V | Metal Composition VI | Metal Composition VII | Metal Composition VIII | Metal Composition IX | Metal Composition X | Metal Composition XI |
|---|---|---|---|---|---|---|---|---|---|---|---|
| Calcium | 15–45 | 10–25 | 10–25 | 5–20 | .1–4 | .1–4 | .05–10 | — | — | — | — |
| Silicon | 50–70 | 45–75 | 50–70 | 25–50 | 15–55 | 40–80 | 10–70 | .1–10 | .5–45 | .01–35 | .05–60 |
| Iron | .1–35 | 1–20 | 1–15 | 15–35 | 40–85 | 20–50 | .01–25 | 5–30 | 10–80 | 5–95 | 2–60 |
| Carbon | .1–2 | .1–2 | .1–2 | .1–2 | .05–1 | .05–1 | — | .05–10 | .05–8.5 | .01–10 | .01–10 |
| Aluminum | .1–3 | .1–5 | .1–5 | 10–30 | .1–10 | .1–10 | — | — | — | .05–10 | .05–10 |
| Manganese | .1–5 | 5–35 | .1–2 | .1–5 | .01–8 | .01–8 | — | 70–95 | 15–75 | .05–5 | .05–5 |
| Barium | .1–5 | .1–5 | 5–25 | 1–20 | — | — | — | — | — | — | — |
| Titanium | .05–2 | .05–2 | .05–2 | .05–2 | .01–.5 | .01–.5 | — | — | — | 5–40 | 40–80 |
| Phosphorus | .005–.05 | .005–.05 | .005–.05 | .005–.05 | .01–.05 | .01–.05 | — | .05–.75 | .05–.75 | — | — |
| Sulfur | .005–.1 | .005–.1 | .005–.1 | .005–.1 | .005–.1 | .005–.1 | — | .005–.1 | .005–.1 | — | — |
| Strontium | — | — | .1–1 | — | — | — | — | — | — | — | — |
| Magnesium | — | — | — | — | .1–12 | .1–12 | 10–70 | — | — | — | — |
| Cerium | — | — | — | — | <.001–5 | .001–5 | .005–10 | — | — | — | — |
| Lanthanum | — | — | — | — | <.001–5 | .001–5 | .005–10 | — | — | — | — |
| Chromium | — | — | — | — | .01–.75 | .01–.75 | — | .05–1 | .05–1 | .05–5 | .05–5 |
| Copper | — | — | — | — | .01–.5 | .01–.5 | — | — | — | — | — |
| Nickel | — | — | — | — | .01–.75 | .01–.75 | — | — | — | — | — |
| Nitrogen | — | — | — | — | — | — | — | .01–10 | .01–10 | — | — |
| Vanadium | — | — | — | — | — | — | — | — | — | .05–5 | .05–5 |

The metal compositions of TABLE I can each additionally include trace amounts, i.e., from less than about 0.001% to about 0.5% by weight, of the elements for which no percentage is given or other elements.

Specific examples of steel-making alloys which can be used as the metal composition of the present invention are known in the trade as calcium-silicon (CaSi), calsibar (CaSiBa), magnesium ferrosilicon (MgFeSi), hypercal (AlBaCaFeSi), silicomanganese (MnFeSi), and magnesium silicide ($Mg_2Si$).

More specifically, in the practice of the present invention, the coating composition for protecting corrodible metallic surfaces contains the binder in an amount preferably within the range of from about 3 to about 70 percent by weight of the coating composition, and preferably in an amount which is within the range of from about 3 to 50 percent by weight of the coating composition.

Various binder materials, both organic and inorganic, can be used. The choice of the particular binder is dependent upon the characteristics which are desired for the protective coating composition in each particular instance. The binder, for example, may be selected from such organics as epoxy resins, chlorinated rubber, polystyrene, polyvinyl butyral resins, polyvinyl acetate resins, silicones, alkyd and phenolic resins, or the like. Additionally, such inorganic binders as those obtained from silicates, such as the alkali metal silicates including sodium silicates, phosphates, hydrolyzed ethyl silicates, butyl titanates, and the like may be employed. It is believed that the use of these and other similar binder materials will be apparent to those skilled in the art so that the particular binder suitable in each instance can be selected from use in the coating composition of the present invention.

Mixtures of metal compositions, i.e., the alloys and silicides set forth hereinabove, may be employed with equally advantageous results.

The aloys and/or silicides employed in the anti-corrosive coating compositions of the present invention are conveniently prepared by any suitable method known to the art as, for example, by carbon reduction of the active metal oxide such as lime (CaO) with silica ($SiO_2$) in the submerged-arc electric furnace typical of the ferroalloy industry.

The conductive metal particles which are more anodic than the metal of the substrate to be protected may be particles of the various suitable metals, the specific choice in each instance depending upon the metal of the substrate. In many instances, it has been found that zinc particles produce excellent results on iron and steel and, for this reason, such particles are generally preferred. Other metal particles may be used, however, such as aluminum, magnesium, and the like, as well as particles of metal alloys, so long as these metal particles are electrically conductive and more anodic than the metal of the substrate which is to be protected.

The conductive metal particles, alloys, and/or silicides are dispersed in the selected binder in finely divided form. Desirably, the conductive metal particles, alloys, and/or silicides have an average size within the range of from about 2 to about 10 microns, preferably within the range of from about 5 to about 7 microns. The alloys and/or silicides may be conveniently comminuted by any suitable crushing or grinding operation, preferably in a carbon dioxide atmosphere to minimize any dust explosion hazard from the active alloy surface. Methods of preparation for the conductive metal particles are extensive and well known to those of skill in the art.

The coating composition of the present invention may be formulated by admixing the binder, the conductive metal particles, and particles of the metal composition, i.e., the alloy or silicide, by using any suitable mixing technique.

Depending upon the particular binder used, the composition may also contain suitable solvents, curing agents, plasticizers, and the like. Exemplary of suitable solvents are mineral spirits, methanol, ethanol, butanol, isopropanol, ethyl butyl ketone, xylene, toluene, methylisopropylketone, ethylene glycol monobutyl ether, ethylene glycol monoethyl ether, ethylene glycol monoethyl ether acetate, ethyl acetate, butyl acetate, and the like.

Exemplary of suitable curing agents are cobalt, lead, manganese, driers such as naphthanates, polyamines such as triethylenetetramine, polyamide resins such as those prepared from a fatty dibasic acid and ethylene diamine, phosphoric acid, oxalic acid, and the like.

Generally, the solvents may be present in amounts within the range of from about 5 to about 60 percent by weight of the composition while the curing agents and plasticizers may each be present in amounts up to about 70 percent by weight of the composition, respectively.

It is to be appreciated, of course, that the specific amounts of these components, as well as the types used, will depend in each instance upon the particular binder, as well as the ultimate characteristics desired for the particular coating composition and use.

The coating compositions of this invention may also contain other components which enhance the corrosion protection of the filler such as the refractory ferroalloys including those selected from ferromanganese, ferromolybdenum, ferrosilicon, ferrochrome, ferrovanadium, ferrozirconium, ferrotitanium, ferrotungsten, ferroboron, ferrophosphorus, iron carbide, and mixtures thereof. A preferred ferroalloy is ferrophosphorus and generally such multiple component systems would contain the ferroalloy in an amount up to about 75 percent of the weight of the filler.

The thus formulated composition may then be applied to the metal surface to be protected using any suitable technique as, for example, by spraying, brushing, immersion, flowing, or the like. Generally, the coatings are applied to produce a resultant coating or film having an average thickness of from about 0.4 to about 15 mils, preferably from about 2 to about 12 mils. Generally, this film comprises the binder in an amount of from about 3 to about 70 percent by weight, preferably from about 7 to about 50 percent by weight, with the conductive metal particles and particles of the metal composition, i.e., particles of the alloy and/or silicide, present in an amount of from about 30 to about 97 percent by weight, preferably from about 50 to about 93 percent by weight. Though any amount of conductive metal particles can be used with the alloy and/or silicide of the present invention, it is preferred that about 10 to about 70 percent of the filler be an alloy and/or silicide of an active metal, and most preferred that from about 25 to about 50 percent of the filler be such.

Following the application of the protective coating composition to the metal surface to be protected, drying and/or curing of the coating is effected. The particular type and extent of the drying and/or curing will necessarily vary in each particular instance, depending upon the specific nature of the binder material which is used in the composition. Therefore, in some instances, heating may be utilized to effect drying or curing of the protective coating, while in other instances, air drying or curing may prove sufficient.

The thus formed protective coatings are found to provide a high degree of protection against corrosion to the corrodible metal substrates to which they are applied, including substrates of ferrous metal, copper, and the like. Depending upon the particular metallic surface to be protected, the conductive metal particles and alloy and/or silicide employed in the coating composition is changed so as to utilize conductive metal particles, alloys, and/or silicides which are sufficiently more anodic than the metallic surface so as to provide the desired degree of protection. In this regard, it is to be noted that the protective coatings of the present invention act anodically to provide the necessary protection against corrosion for the metallic surfaces to which they are applied. Thus, the coatings of the present invention are found to provide excellent corrosion protection of the anodic type of numerous metal surfaces in contact with corrosive media such as underground pipelines, ships hulls, offshore drilling platforms, and the like.

In order that those skilled in the art may better understand the present invention in the manner in which it may be practiced, the following specific examples are given. In these examples, the salt-fog test is accomplished in accordance with ASTM Test Number B-117-73 and, unless otherwise indicated, parts and percentages are by weight. It is to be appreciated, however, that these examples are merely exemplary of the present invention and not to be taken as a limitation thereof.

EXAMPLE 1

Various coating compositions were formed by admixing a hydrolyzed ethyl silicate binder, comprised of approximately 20 percent solids, with a filler component in a weight ratio of 100 parts by weight of binder to 225 parts by weight of filler. The filler comprised 100 percent zinc particles as a control and varying ratios of zinc particles with active metal silicon alloys and/or silicides; varying ratios with ferrophosphorus filler; and a 100 percent active metal silicon alloy and/or silicide filler. The varying compositions are as presented in TABLE II.

TABLE II
ETHYL SILICATE VEHICLE

| Formulation | Zinc | Fe₂P | Mg—Fe—Si (5% Mg) | Mg—Fe—Si (9% Mg) | Binder |
|---|---|---|---|---|---|
| A(100% Zn) | 225 | — | — | — | 100 |
| B(75% Zn) | 169 | 56 | — | — | 100 |
| C(75% Zn) | 169 | — | 56 | — | 100 |
| D(0% Zn) | — | — | 225 | — | 100 |
| E(75% Zn) | 169 | — | — | 56 | 100 |
| F(0% Zn) | — | — | — | 225 | 100 |

Standard four inch by eight inch cold-rolled steel panels were sandblasted and coated with the above formulations and then air cured at room temperature at about 50 percent relative humidity for five days. Thereafter, the panels were scribed crosshatching and were tested for corrosion resistance by subjecting them to the known salt-fog exposure test (ASTM B-117-73) for a maximum of 840 hours. TABLE III sets out the results of such tests at 672 hours and at 840 hours.

TABLE III
ETHYL SILICATE VEHICLE
Salt-Fog Results

| Formulation | 672 Hours Scribed | 672 Hours Face | 840 Hours Scribed | 840 Hours Face |
|---|---|---|---|---|
| A | 3 | 9+ | 1-2 | 9+ |
| B | 0 | 2-5 | 0 | 2-5 |
| C | 10 | 10 | 9 | 10 |
| D | 2-3 | 5 | 1 | 5 |
| E | 10 | 10 | 10 | 10 |
| F | 0 | 6 | 0 | 5 |

The panels were evaluated on a scale of from 0 to 10, wherein 10 is perfect and 0 is 100 percent rusted. As can be seen, the panel having a filler composed of 100 percent zinc had severe rust on the scribed portion of the panel at both the 672 hour and 840 hour test points, while the panels containing 25 percent active metal silicon alloy or silicide with 75 percent zinc had little, if any, rust on the scribe after the 672 hour and 840 hour testing points. When compared to a filler comprising 75 percent zinc and 25 percent ferrophosphorus, the activity of the active metal silicon alloy or silicide in its anticorrosion function is further dramatically accentuated.

EXAMPLE 2

Various coating compositions were formed by admixing an epoxy ester binder, comprised of approximately 50 percent solids, with a filler component in a weight ratio of approximately 1:3. The filler comprised 100 percent zinc particles as a control and varying ratios of zinc particles with active metal silicon alloys and/or silicides, varying ratios with ferrophosphorus filler, and a 100 percent active metal silicon alloy and/or silicide filler. The varying compositions are as presented in TABLE IV.

TABLE IV
EPOXY ESTER VEHICLE

| Formulation | A (100% Zn) | B (75% Zn) | C (50% Zn) | D (25% Zn) | E (No Zn) |
|---|---|---|---|---|---|
| Zinc dust | 306 | 229.5 | 153 | 76.5 | — |
| Silicon Compound and/or Fe₂P | — | 76.5 | 153 | 229.5 | 306 |
| Epoxy ester resin (50% solids) | 37.6 | 37.6 | 37.6 | 37.6 | 37.6 |
| MPA-60 (Suspension agent) | 2.0 | 2.0 | 2.0 | 2.0 | 2.0 |
| Syloid Al-1 (Suspension agent) | 3.8 | 3.8 | 3.8 | 3.8 | 3.8 |
| CaO | 2.0 | 2.0 | 2.0 | 2.0 | 2.0 |
| 6% Co napthenate | 0.6 | 0.6 | 0.6 | 0.6 | 0.6 |
| 6% Mn napthenate | 0.6 | 0.6 | 0.6 | 0.6 | 0.6 |
| Exkin #1 | 0.4 | 0.4 | 0.4 | 0.4 | 0.4 |
| Xylene | 58.0 | 58.0 | 58.0 | 58.0 | 58.0 |

Standard 4 inch by 8 inch cold-rolled steel panels were cleaned and thereafter sprayed with the above formulations. The resulting coatings were air dried for 20 minutes and then baked at 135° C. for 45 minutes. The panels were then aged for 72 hours at room temperature. Thereafter, the panels were scored by crosshatching and subjected to 250 hours as salt-fog exposure (ASTM B-117-73). The results are as tabulated in TABLE V wherein the active metal silicon alloy or silicide and/or Fe₂P utilized is set out adjacent the formulation designation.

TABLE V
EPOXY ESTER 250 HOUR SALT-FOG RESULTS (WEIGHT %)

| Formulation | Scribe Rust* | Surface Rust |
|---|---|---|
| A Zinc | 5 VL | 10 |
| B Ferrophosphorus | 0 L | 9 |
| C Ferrophosphorus | 0 M | 7 |
| D Ferrophosphorus | 0 H | 4 |
| E Ferrophosphorus | 0 Comp. | 0 |
| B Mg—Fe—Si (5% Mg) | 0 L | 9 |
| C Mg—Fe—Si (5% Mg) | 0 M | 6 |
| D Mg—Fe—Si (5% Mg) | 0 H | 4 |
| E Mg—Fe—Si (5% Mg) | 0 M | 6 |
| B Mg—Fe—Si (9% Mg) | 0 L | 9+ |
| C Mg—Fe—Si (9% Mg) | 0 M | 9 |
| D Mg—Fe—Si (9% Mg) | 0 M | 6 |
| E Mg—Fe—Si (9% Mg) | 0 M | 7 |
| B Mn—Fe—Si | 2 L | 9+ |
| C Mn—Fe—Si | 0 M | 7 |
| D Mn—Fe—Si | 0 M | 7 |
| E Mn—Fe—Si | 0 Comp. | 0 |
| B Hypercal (CaAlBaFeSi) | 1 L | 8 |
| C Hypercal (CaAlBaFeSi) | 2 L | 6 |
| D Hypercal (CaAlBaFeSi) | 0 L | 3 |
| E Hypercal (CaAlBaFeSi) | 0 Comp. | 0 |

*L = Light rusting
M = Medium rusting
H = Heavy rusting
Comp. = Complete heavy rusting
V = Very
S = Slight There is a significant difference in density between the metal compositions of the instant invention and the zinc dust control, the zinc dust in some instances being more than twice as dense as the metal composition utilized. Accordingly, when zinc is partially or completely substituted in EXAMPLES 1 and 2, the volume of the coating composition was significantly expanded and the zinc particles were accordingly greater dispersed.

The following example is provided to show what happens when zinc dust is substituted in whole or part by equal volumes of the metal composition, i.e., the silicon alloys and/or silicides, of the instant invention. It is pointed out that with such substitution, there is a significant reduction in the amount of active metal silicon alloy and/or silicide particles contained per unit volume of the applied coating.

EXAMPLE 3

Coating compositions were prepared containing the components of EXAMPLE 2 in the same weight ratios with the exception that substitution of the zinc with the active metal silicon alloys or silicides of the instant invention and ferrophosphorus was on a volume basis. TABLE VI sets out the amount by weight of active metal silicon alloys or silicides of the instant invention which were admixed in formulations corresponding to A-E of EXAMPLE 2 based upon the density of zinc being 7.15. An additional formulation F was prepared containing a 50% by volume substitution of zinc with a mixture containing equal volumes of ferrophosphorus and various of the active metal silicon alloys or silicides of the instant invention.

TABLE VI

|  | Density | Zn/Alloy Densities | B (75% Zn) | C (50% Zn) | D (25% Zn) | E (No Zn) | F (50% Zn) |
|---|---|---|---|---|---|---|---|
| Ferrophosphorus | 6.50 | 1.10 | 69 | 139.1 | 208.6 | 278.1 | 69 |
| CaSi | 2.60 | 2.75 | 37.7 | 75.4 | 113.1 | 150.7 | 37.7 |
| MgFeSi (5% Mg) | 4.19 | 1.71 | 59.8 | 119.5 | 179.3 | 239.0 | 59.8 |
| MgFeSi (9% Mg) | 3.92 | 1.82 | 53.1 | 106.3 | 159.4 | 212.5 | 53.1 |
| Ca—Ba—Si | 2.61 | 2.74 | 37.3 | 74.6 | 112.0 | 149.3 | 37.3 |
| Ca—Al—Ba—Fe—Si | 2.79 | 2.56 | 39.8 | 79.7 | 119.5 | 159.4 | 39.8 |
| MnFeSi | 5.70 | 1.25 | 70.2 | 140.4 | 210.6 | 280.7 | 70.2 |

Standard 4 inch by 8 inch cold-rolled steel panels were cleaned and thereafter sprayed with the above formulations. The resulting coatings were air dried for 20 minutes and then baked at 135° C. for 45 minutes. The panels were then aged for 72 hours at room temperature. Thereafter, the panels were scribed by cross-hatching and subjected to 250 hours of salt-fog exposure (ASTM B-117-73). The results are as tabulated in TABLE VII wherein the active metal silicon alloy or silicide or $Fe_2P$ utilized is set out adjacent the formulation designation.

TABLE VII

| EPOXY ESTER 250 HOUR SALT-FOG RESULTS (VOLUME %) | | |
|---|---|---|
| Formulation | Scribe Rust* | Surface Rust |
| A Zinc | 9 VVL | 10— |
| B Ferrophosphorus | 1 L | 9 |
| C Ferrophosphorus | 0 M | 7— |
| D Ferrophosphorus | 0 L-M | 4+ |
| E Ferrophosphorus | 0 S | 0 |
| B Ca—Si | 5 VI | 9+ |
| C Ca—Si | 0 L-M | 6 |
| D Ca—Si | 0 S | 4 |
| E Ca—Si | 0 L-S | 3 |
| F Ca—Si | 0 L-M | 7 |

TABLE VII-continued

| EPOXY ESTER 250 HOUR SALT-FOG RESULTS (VOLUME %) | | |
|---|---|---|
| Formulation | Scribe Rust* | Surface Rust |
| B Mg—Fe—Si(5% Mg) | 0 L | 9 |
| C Mg—Fe—Si(5% Mg) | 0 L-M | 6 |
| D Mg—Fe—Si(5% Mg) | 0 M | 6 |
| E Mg—Fe—Si(5% Mg) | 0 L-S | 4 |
| F Mg—Fe—Si(5% Mg) | 0 L-M | 7+ |
| B Mg—Fe—Si(9% Mg) | 3 L | 9 |
| C Mg—Fe—Si(9% Mg) | 0 M | 5 |
| D Mg—Fe—Si(9% Mg) | 0 M | 6+ |
| E Mg—Fe—Si(9% Mg) | 0 L-S | 4 |
| F Mg—Fe—Si(9% Mg) | 0 L-M | 6+ |
| B Ca—Ba—Si | 0 VL | 7— |
| C Ca—Ba—Si | 0 M | 4 |
| D Ca—Ba—Si | 0 M-S | 4+ |
| E Ca—Ba—Si | 0 S | 3 |
| F Ca—Ba—Si | 0 M | 3 |
| B Ca—Al—Ba—Fe—Si Hypercal | 0 VI | 10— |
| C Ca—Al—Ba—Fe—Si Hypercal | 0 L | 6 |
| D Ca—Al—Ba—Fe—Si Hypercal | 0 L-M | 4 |
| E Ca—Al—Ba—Fe—Si Hypercal | 0 S | 0 |
| F Ca—Al—Ba—Fe—Si Hypercal | 0 L-M | 5 |
| B Mn—Fe—Si | 9 VI | 10— |
| C Mn—Fe—Si | 0 L | 8 |
| D Mn—Fe—Si | 0 M | 4 |
| E Mn—Fe—Si | 0 S | 0 |
| F Mn—Fe—Si | 0 L-M | 6 |

*L = Light rusting
M = Medium rusting
H = Heavy rusting
V = Very
S = Slight

EXAMPLE 4

Various coating compositions were formed by admixing a hydrolyzed silicate binder, composed of approximately 20% solids with a filler component in a weight ratio of 100 parts by weight of binder to 225 parts by weight of the filler. The filler comprised 100% zinc particles as a control and varying ratios of zinc particles with particles of metals and metal compositions, including alloys and/or silicides.

Standard 4 inch by 8 inch cold rolled steel panels were cleaned and thereafter sprayed with the coating compositions shown in TABLE IX. The resulting coatings were air cured at room temperature at about 50% relative humidity for five days. Thereafter, the panels were scribed by cross-hatching and subjected to 3500 hours of salt-fog exposure (ASTM B-117-73). The results are tabulated in TABLE IX.

TABLE IX
ETHYL SILICATE SALT-FOG RESULTS

| Coating Composition | % Zinc | % Alloy | 1000 Hours Scribe | 1000 Hours Face | 1500 Hours Scribe | 1500 Hours Face | 3500 Hours Scribe | 3500 Hours Face |
|---|---|---|---|---|---|---|---|---|
| 1 | 100 | 0 | 9,10 | 9,10 | 10,5 | 10,9− | 0.5,0.5 | 8,9+ |
| 2 | 77 | 23 FeMn | 10,8 | 10,10 | 4,10 | 9+,10 | 1,1.5 | 8.5,7.5 |
| 3 | 53 | 47 FeMn | 10,10 | 10,10 | 9,9 | 9+,9.5 | 5,3 | 8.0,8.0 |
| 4 | 27 | 73 FeMn | 10,10 | 10,10 | 10−,10 | 10−,9.5 | 0.5 | 8− |
| 5 | 53 | 10 Cu 37 Fe₂P | 0,0 | 1,2 | — | — | — | — |
| 6 | 47 | 11 Cu 42 FeMn | 5,10 | 7.5,7.5 | 9.5,3.5 | 8.5,8− | 0.5 | 5+ |
| 7 | 50 | 50 CaSi | 10,10 | 10,10 | 10,10− | 10−,10− | 6,4 V.V.S. | 9,8.5 |
| 8 | 25 | 75 CaSi | 10−,10− | 8,9 | 10−,10− | 8.5,7.5 | 2.5,3 V.V.S. | 6.5,6 |
| 9 | 50 | 50 5MgFeSi | 10,10 | 10,10 | 10,10 | 10,10 | 10,10 | 10,10 |
| 10 | 25 | 75 5MgFeSi | 9,7 | 7,7 | 7,8 | 6,6 | 5,6 | 6,6.5 |
| 11 | 75 | 25 CaSi | 10,10 | 10,10 | 10,10 | 10,10 | 10,10 | 10,10 |
| 12 | 75 | 25 5MgFeSi | 10,10 | 10,10 | 10,10 | 10,10 | 10,10 | 10,10 |

EXAMPLE 5

Various coating compositions were formed by admixing a hydrolyzed silicate binder comprised of approximately 20% solids with a filler component and a weight ratio of 100 parts by weight binder to 225 parts by weight filler. The filler comprised 95% zinc particles and 5% zinc yellow particles as a control and varying ratios of ferrophosphorus and various metals and metal compositions including silicon alloys and/or silicides.

Standard 4 inch by 8 inch cold-rolled steel panels were cleaned and thereafter sprayed with the coating composition shown in TABLE X. The resulting coatings were air cured at room temperature at about 50% relative humidity for five days. Thereafter, the panels were scribed by cross-hatching and subjected to 3000 hours of salt-fog exposure (ASTM B-117-73). The results are tabulated in TABLE X.

TABLE X
ETHYL SILICATE SALT-FOG RESULTS

| Coating Composition | % Zinc | % Ferrophosphorus | % Alloy | % Zinc Yellow (Zinc Chromate) | 1500 Hours Scribe | 1500 Hours Face | 2500 Hours Scribe | 2500 Hours Face | 3000 Hours Scribe | 3000 Hours Face |
|---|---|---|---|---|---|---|---|---|---|---|
| 1 | 95 | 0 | 0 | 5 | 10,10 | 10,10 | 10,10 | 10,10 | 10,10 | 10,10 |
| 2 | 43 | 39 | 13 FeMn | 5 | 10,10 | 10,10 | 10,10 | 10,10 | 10,10 | 10,10 |
| 3 | 29 | 39 | 26 FeMn | 5 | 10,10 | 10,10 | 10,10 | 10,10 | 10,10 | 10,10 |
| 4 | 15 | 40 | 40 FeMn | 5 | 10,10 | 10,10 | 10,10 | 10,10 | 10,10 | 10,10 |
| 5 | 42 | 38 | 15 CaSi | 5 | 10,10 | 10,10 | 10,10 | 10,10 | 10,10 | 10,10 |
| 6 | 28 | 38 | 29 CaSi | 5 | 10,10 | 10,10 | 10,10 | 10,10 | 10,10 | 10,10 |
| 7 | 14 | 38 | 43 CaSi | 5 | 10,10 | 10,10 | 10,10 | 10,10 | 10,10 | 10,10 |
| 8 | 42 | 38 | 15 5MgFeSi | 5 | 10,10 | 10,10 | 10,10 | 10,10 | 10,10 | 10,10 |
| 9 | 28 | 38 | 29 5MgFeSi | 5 | 10,10 | 10,10 | 10,10 | 10,10 | 10,10 | 10,10 |
| 10 | 14 | 38 | 43 5MgFeSi | 5 | 2.5,10 | 8,10 | 4,10 | 6,8.5 | 3,5 | 8,8− |
| 11 | 44 | 40 | 13 FeMn | 3 | 10,10 | 10,10 | 10,10 | 10,10 | 10,10 | 10,10 |
| 12 | 30 | 40 | 27 FeMn | 3 | 10,10 | 10,10 | 10,10 | 10,10 | 10,10 | 10,10− |
| 13 | 15 | 41 | 41 FeMn | 3 | 10,10 | 10,10 | 10,10 | 10,10 | 10,10 | 10,10− |
| 14 | 44 | 39 | 15 CaSi | 3 | 10,10 | 10,10 | 10,10 | 10,10 | 10,10 | 10,10 |
| 15 | 28 | 39 | 30 CaSi | 3 | 10,10 | 10,10 | 10,10 | 10,10 | 10,10 | 10,10 |
| 16 | 14 | 39 | 44 CaSi | 3 | 10,10 | 10,10 | 10,10 | 10,10 | 10,10 | 10,10 |
| 17 | 43 | 39 | 15 MgFeSi | 3 | 10,10 | 10,10 | 10,10 | 10,10 | 10,10 | 10,10 |
| 18 | 29 | 39 | 29 5MgFeSi | 3 | 10,10 | 10,10− | 10,10 | 10,10 | 10,10 | 10,10 |
| 19 | 14 | 39 | 44 5MgFeSi | 3 | 10,10 | 10,10− | 10,9.6 | 7.5,7.5 | 9,7.0 | 9,7.0 |

While there have been described various embodiments of the invention, the compositions and methods described are not intended to be understood as limiting the scope of the invention, as changes therewithin are possible. It is intended that each element recited in any of the following claims is to be understood as referring to all equivalent elements for accomplishing substantially the same results in substantially the same equivalent manner, it being intended to cover the invention broadly in whatever form its principle may be utilized.

What is claimed is:

1. A coating composition suitable for the protection of corrodible metallic surfaces which comprises a binder and a filler, the filler being present in an amount sufficient to impart corrosion-resistant characteristics to the coating composition and comprising conductive metal particles and particles of a metal composition comprising between about 50% and about 75% by weight silicon, between about 10% and about 25% by weight calcium, and between about 5% and about 25% by weight barium, such a metal composition being unstable when introduced alone into water.

2. A coating composition suitable for the protection of corrodible metallic surfaces which comprises a binder and a filler, the filler being present in an amount sufficient to impart corrosion-resistant characteristics to the coating composition and comprising conductive metal particles and particles of a metal composition comprising between about 25% and about 50% by weight silicon, between about 5% and about 20% by weight calcium, between about 1% and about 20% by weight barium, and between about 10% and about 30% by weight aluminum, such a metal composition being unstable when introduced alone into water.

3. A coating composition suitable for the protection of corrodible metallic surfaces which comprises a binder and a filler, the filler being present in an amount sufficient to impart corrosion-resistant characteristics to the coating composition and comprising conductive metal particles and particles of a metal composition comprising between about 25% and about 50% by weight silicon, between about 5% and about 20% by weight calcium, between about 1% and about 20% by weight barium, between about 10% and about 30% by weight aluminum, and between about 15% and about 35% by weight iron, such a metal composition being unstable when introduced alone into water.

4. A coating composition suitable for the protection of corrodible metallic surfaces which comprises a binder and a filler, the filler being present in an amount sufficient to impart corrosion-resistant characteristics to the coating composition and comprising conductive metal particles and particles of a metal composition comprising between about 0.1% and about 10% by weight silicon, between about 70% and about 95% by weight manganese, between about 0.05% and about 10% by weight carbon, and between about 5% and about 30% by weight iron, such a metal composition being unstable when introduced alone into water.

5. A coating composition suitable for the protection of corrodible metallic surfaces which comprises a binder and a filler, the filler being present in an amount sufficient to impart corrosion-resistant characteristics to the coating composition and comprising conductive metal particles and particles of a metal composition comprising between about 0.1 and about 35% by weight silicon, between about 5% and about 40% by weight titanium, and between about 5% and about 95% by weight iron, such a metal composition being unstable when introduced alone into water.

6. A coating composition suitable for the protection of corrodible metallic surfaces which comprises a binder and a filler, the filler being present in an amount sufficient to impart corrosion-resistant characteristics to the coating composition and comprising conductive metal particles and particles of a metal composition comprising between about 0.05% and about 60% by weight silicon, between about 40% and about 80% by weight titanium, and between about 2% and about 60% by weight iron, such a metal composition being unstable when introduced alone into water.

7. A coating composition suitable for the protection of corrodible metallic surfaces which comprises a binder and a filler, the filler being present in an amount sufficient to impart corrosion-resistant characteristics to the coating composition and comprising conductive metal particles and particles of a metal composition comprising by weight between about 15% and about 45% calcium, between about 50% and about 70% silicon, between about 0.1% and about 35% iron, between about 0.1% and about 2% carbon, between about 0.1% and about 3% aluminum, between about 0.1% and about 5% manganese, between about 0.1% and about 5% barium, between about 0.05% and about 2% titanium, between about 0.005% and about 0.05% phosphorus, and between about 0.005% and about 0.10% sulfur.

8. A coating composition suitable for the protection of corrodible metallic surfaces which comprises a binder and a filler, the filler being present in an amount sufficient to impart corrosion-resistant characteristics to the coating composition and comprising conductive metal particles and particles of a metal composition comprising by weight between about 10% and about 25% calcium, between about 45% and about 75% silicon, between about 5% and about 35% manganese, between about 1% and about 20% iron, between about 0.1% and about 2% carbon, between about 0.1% and about 5% aluminum, between about 0.1% and about 5% barium, between about 0.05% and about 2% titanium, between about 0.005% and about 0.05% phosphorus, and between about 0.005% and about 0.10% sulfur.

9. A coating composition suitable for the protection of corrodible metallic surfaces which comprises a binder and a filler, the filler being present in an amount sufficient to impart corrosion-resistant characteristics to the coating composition and comprising conductive metal particles and particles of a metal composition comprising by weight between about 10% and about 25% calcium, between about 50% and about 70% silicon, between about 5% and about 25% barium, between about 1% and about 15% iron, between about 0.1% and about 2% manganese, between about 0.1% and about 5% aluminum, between about 0.1% and about 1% strontium, between about 0.1% and about 2% carbon, between about 0.05% and about 2% titanium, between about 0.005% and about 0.05% phosphorus, and between about 0.005% and about 0.10% sulfur.

10. A coating composition suitable for the protection of corrodible metallic surfaces which comprises a binder and a filler, the filler being present in an amount sufficient to impart corrosion-resistant characteristics to the coating composition and comprising conductive metal particles and particles of a metal composition comprising by weight between about 5% and about 20% calcium, between about 25% and about 50% silicon, between about 1% and about 20% barium, between about 15% and about 35% iron, between about 10% and about 30% aluminum, between about 0.1% and about 2% carbon, between about 0.1% and about 5% manganese, between about 0.05% and about 2% titanium, between about 0.005% and about 0.05% phosphorus, and between about 0.005% and about 0.10% sulfur.

11. A coating composition suitable for the protection of corrodible metallic surfaces which comprises a binder and a filler, the filler being present in an amount sufficient to impart corrosion-resistant characteristics to the coating composition and comprising conductive metal particles and particles of a metal composition comprising by weight between about 40% and about 85% iron, between about 15% and about 55% silicon, between about 0.10% and about 10% aluminum, between about 0.10% and about 4% calcium, between about 0.05% and about 1% carbon, between about 0.10% and about 12% magnesium, between less than about 0.001% and about 5% cerium, between less than about 0.001% and about 5% lanthanum, between about 0.01% and about 0.75% chromium, between about 0.01% and about 0.50% copper, between about B 0.01% and about 8% manganese, between about 0.01% and about 0.75% nickel, between about 0.01% and about 0.50% titanium, between about 0.01% and about 0.05% phosphorus, and between about 0.005% and about 0.10% sulfur.

12. A coating composition suitable for the protection of corrodible metallic surfaces which comprises a binder and a filler, the filler being present in an amount sufficient to impart corrosion-resistant characteristics to the coating composition and comprising conductive metal particles and particles of a metal composition comprising by weight between about 20% and about 50% iron, between about 40% and about 80% silicon, between about 0.10% and about 10% aluminum, between about 0.10% and about 4% calcium, between about 0.05% and about 1% carbon, between about 0.10% and about 12% magnesium, between about 0.001% and about 5% cerium, between about 0.001% and about 5% lanthanum, between about 0.01% and about 0.75% chromium, between about 0.01% and about 0.50% copper, between about 0.01% and about 8% manganese, between about 0.01% and about 0.75% nickel, between about 0.01% and about 0.50% titanium, between about 0.01% and about 0.05% phosphorus, and between about 0.005% and about 0.10% sulfur.

13. A coating composition suitable for the protection of corrodible metallic surfaces which comprises a binder and a filler, the filler being present in an amount sufficient to impart corrosion-resistant characteristics to the coating composition and comprising conductive metal particles and particles of a metal composition comprising by weight between about 10% and about 70% magnesium, between about 10% and about 70% silicon, between about 0.05% and about 10% calcium, between about 0.005% and about 10% cerium, between about 0.005% and about 10% lanthanum, and between about 0.01% and about 25% iron.

14. A coating composition suitable for the protection of corrodible metallic surfaces which comprises a binder and a filler, the filler being present in an amount sufficient to impart corrosion-resistant characteristics to the coating composition and comprising conductive metal particles and particles of a metal composition comprising by weight between about 70% and about 95% manganese, between about 5% and about 30% iron, between about 0.05% and about 10% carbon, between about 0.1% and about 10% silicon, between about 0.05% and about 0.75% phosphorus, between about 0.01% and about 10% nitrogen, between about 0.05% and about 1% chromium, and between about 0.005% and about 0.10% sulfur.

15. A coating composition suitable for the protection of corrodible metallic surfaces which comprises a binder and a filler, the filler being present in an amount sufficient to impart corrosion-resistant characteristics to the coating composition and comprising conductive metal particles and particles of a metal composition comprising by weight between about 15% and about 75% manganese, between about 10% and about 80% iron, between about 0.05% and about 8.5% carbon, between about 0.50% and about 45% silicon, between about 0.05% and about 0.75% phosphorus, between about 0.01% and about 10% nitrogen, between about 0.05% and about 1% chromium, and between about 0.005% and about 0.10% sulfur.

16. A coating composition suitable for the protection of corrodible metallic surfaces which comprises a binder and a filler, the filler being present in an amount sufficient to impart corrosion-resistant characteristics to the coating composition and comprising conductive metal particles and particles of a metal composition comprising by weight between about 5% and about 40% titanium, between about 5% and about 95% iron, between about 0.01% and about 35% silicon, between about 0.01% and about 10% carbon, between about 0.05% and about 10% aluminum, between about 0.05% and about 5% manganese, between about 0.05% and about 5% chromium, and between about 0.05% and about 5% vanadium.

17. A coating composition suitable for the protection of corrodible metallic surfaces which comprises a binder and a filler, the filler being present in an amount sufficient to impart corrosion-resistant characteristics to the coating composition and comprising conductive metal particles and particles of a metal composition comprising by weight between about 40% and about 80% titanium, between about 2% and about 60% iron, between about 0.05% and about 60% silicon, between about 0.01% and about 10% carbon, between about 0.05% and about 10% aluminum, between about 0.05% and about 5% manganese, between about 0.05% and about 5% chromium, and between about 0.05% and about 5% vanadium.

* * * * *